(12) United States Patent
Rubenstein

(10) Patent No.: US 6,425,301 B1
(45) Date of Patent: Jul. 30, 2002

(54) CONTINUOUSLY VARIABLE TRANSMISSION

(76) Inventor: Howard D. Rubenstein, 131 Farist Rd., Fairfield, CT (US) 06432

( * ) Notice: Subject to any disclaimer, the term of this patent is extended or adjusted under 35 U.S.C. 154(b) by 0 days.

(21) Appl. No.: 09/664,263

(22) Filed: Sep. 18, 2000

Related U.S. Application Data

(63) Continuation-in-part of application No. 09/640,342, filed on Aug. 16, 2000.

(51) Int. Cl.$^7$ ............................................. F16H 29/06
(52) U.S. Cl. ........................ 74/124; 74/125; 74/125.5
(58) Field of Search ....................... 74/116, 117, 120, 74/121, 122, 123, 124, 125, 125.5

(56) References Cited

U.S. PATENT DOCUMENTS

| | | | | |
|---|---|---|---|---|
| 2,554,463 A | * | 5/1951 | Klamp | .......................... 74/124 |
| 3,803,932 A | | 4/1974 | Waddington | |
| 3,874,253 A | | 4/1975 | Waddington | |
| 4,098,147 A | | 7/1978 | Waddington | |
| 4,967,615 A | * | 11/1990 | Mills | ............................ 74/124 |
| 5,071,393 A | | 12/1991 | Genovese | |
| 5,081,877 A | | 1/1992 | Mercat | |
| 5,334,115 A | | 8/1994 | Pires | |
| 5,352,162 A | | 10/1994 | Coronel | |
| 5,390,558 A | * | 2/1995 | Weinberg | ..................... 74/124 |

FOREIGN PATENT DOCUMENTS

| | | | | |
|---|---|---|---|---|
| GB | 002091825 A | * | 8/1982 | ................. 74/125.5 |
| JP | 358091951 A | * | 6/1983 | ................... 74/117 |

* cited by examiner

*Primary Examiner*—Charles A Marmor
*Assistant Examiner*—Ha Ho
(74) *Attorney, Agent, or Firm*—Price and Gess

(57) ABSTRACT

A continuously variable transmission is disclosed to change an input rotational velocity along a continuous spectrum using an eccentrically positioned cam cooperating with a counterweight assembly to counteract the imbalance generated by the eccentric cam. A plurality of cam followers in contact with the cam actuate crankshafts that drive planetary gears disposed about the crankshaft and cooperate with overrunning clutches. The overrunning clutch with the highest instantaneous velocity drives a sun gear connected to an output shaft. The velocity of the output shaft is governed by the eccentricity of the cam.

2 Claims, 4 Drawing Sheets

CONTINUOUSLY VARIABLE TRANSMISSION

This application is a continuation-in-part of U.S. application Ser. No. 09/640,342, filed Aug. 16, 2000.

BACKGROUND OF THE INVENTION

1. Field of the Invention

The invention is directed to the field of continuously variable transmissions.

2. Description of Related Art

Variable transmissions are known in the art for converting an input torque and velocity to an output torque and velocity over a wide range of input-to-output ratios. In a continuously variable transmission, there is a smooth transition from input to output over a spectrum of ratios, as opposed to discrete incremental ratios as with conventional transmissions. Examples of infinitely variable transmissions include the Letters Patent to Pires, U.S. Pat. No. 5,334,115; the Letters Patent to Mercat, U.S. Pat. No. 5,081,877; the Letters Patent to Genovese, U.S. Pat. No. 5,071,393; and the Letters Patent to Coronel, U.S. Pat. No. 5,352,162.

The Pires patent describes a variable transmission relying on an oscillating ratchet. Pires teaches a plurality of different successive intermediate rotations that vary in velocity and direction in accordance with their own respective oscillatory wave form, each waveform being out of phase with one another in a predetermined way. These intermediate rotations are used to convert the rotational input to a plurality of uni-directional output rotations, without the use of overrunning clutches. The outputs vary in velocity in accordance with their own respective waveforms and are used to produce a modified rotational output.

The Genovese patent purports to show a variable ratio transmission with a stationary housing having a variable diameter internal surface and an input and output shaft journalled in the housing for rotation abut a common axis co-axial with the variable diameter internal surface of the housing. A floating eccentric mounted on the input shaft has an external cylindrical surface with the eccentricity of that cylindrical surface with respect to the input shaft being variable between approximately co-axially with the input shaft to a maximum preset eccentricity. A drive member supported co-axially on the floating eccentric has an external cylindrical surface in rolling engagement with the internal of the variable diameter internal surface and coupled to the output shaft. The rotational velocity ratio of the Genovese device between the input and output shaft is varied by varying the diameter of the internal cylindrical surface of the housing and correspondingly varying the degree of eccentricity of the floating eccentric to the input shaft.

The Mercat patent discloses a variable transmission in which a driving element and a driven element are adjustable eccentrically to one another and are coupled via pivotal levers which are journalled on one element and can be brought into force transmitting clamping engagement with the other element via coupling shoes. The two change velocity units are inversely combined with an eccentric positioning device which either jointly actuates the members with the ring tracks associated with the coupling elements or the members with the coupling elements. The force transmitting zones of engagement of the two units are angularly displaced relative to one another and the eccentricities of the two units and also the lever arms associated with the coupling elements can be so selected that transmission ratios result which are free of fluctuations.

The Coronel patent discloses a dual concentric positively infinitely variable transmission which uses a user actuated control to vary the transmission output. The input control varies the orbital relationship and effective gear ratio between a driving ring gear and a driven pinion gear causing both gears to variably orbit the mechanism central axis to produce an output receiving gear and connected output shaft torque converting velocity range, where the velocity varies between a geared neutral stopped position and its maximum output velocity.

The aforementioned devices are complicated, cumbersome transmissions which are difficult to control and were limited to low horsepower. The design of the present invention is to overcome the shortcomings of the prior art of continuously variable transmissions by teaching a simple, compact design having more versatility than previous transmissions.

OBJECTS AND SUMMARY OF THE INVENTION

The present invention can be used to increase or decrease an input rotational velocity along a continuous spectrum using an eccentric cam and a plurality of overrunning clutches. In a first embodiment, a cam plate with an annulus can be pivoted from a concentric to an eccentric position. A plurality of planet gears have crankshafts which are actuated when the cam plate is pivoted in an eccentric position, but are not actuated when the cam plate is in the concentric position. The crankshafts rotate through an angle on their own axis at different speeds, depending on the cam plate eccentricity, as the cam plate orbits eccentrically during a cycle. Each crankshaft drives a one-way overrunning clutch which rotates the planet gears, which drive a sun gear engaged with the planet gears. The sun gear is driven at a minimum by an input velocity by the carrier, and is augmented by the planet gear with the highest rotational speed. The remaining planet gears are then driven by the sun gear as the overrunning clutches relinquish control to the fastest rotating planet gear. The ratio of the output velocity to the input velocity is controlled by the amount of eccentricity of the cam plate, and the spectrum of ratios is continuous over a range.

In a second embodiment, an input velocity drives a cam bearing at input velocity, and the cam bearing can be pivoted from a concentric position to an eccentric position. In the concentric position, crankshafts actuated by an orbiting of said cam plate bearing are not actuated when said cam bearing is in a concentric position, and unlike the previous embodiment the sun gear is not driven at input velocity, resulting in a zero velocity output. However, as the cam bearing is pivoted into an eccentric position, the crankshafts are actuated serially as the cam bearing orbits, and each crankshaft imparts a rotation to its associated planet gear. Each rotation of a planet gear in turn rotates the sun gear which drives the output velocity. The ratio of the output velocity to the input velocity varies between zero and one for this latter embodiment. In a third embodiment, the transmission of the second embodiment is actuated with an actuator rod which drives the cam bearing from a concentric position to an eccentric position.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor for carrying out his invention. Various modifications, however, will remain readily apparent to those skilled in the art, since the general principles of the present invention have been defined herein specifically to provide a continuously variable transmission.

Figure 1:
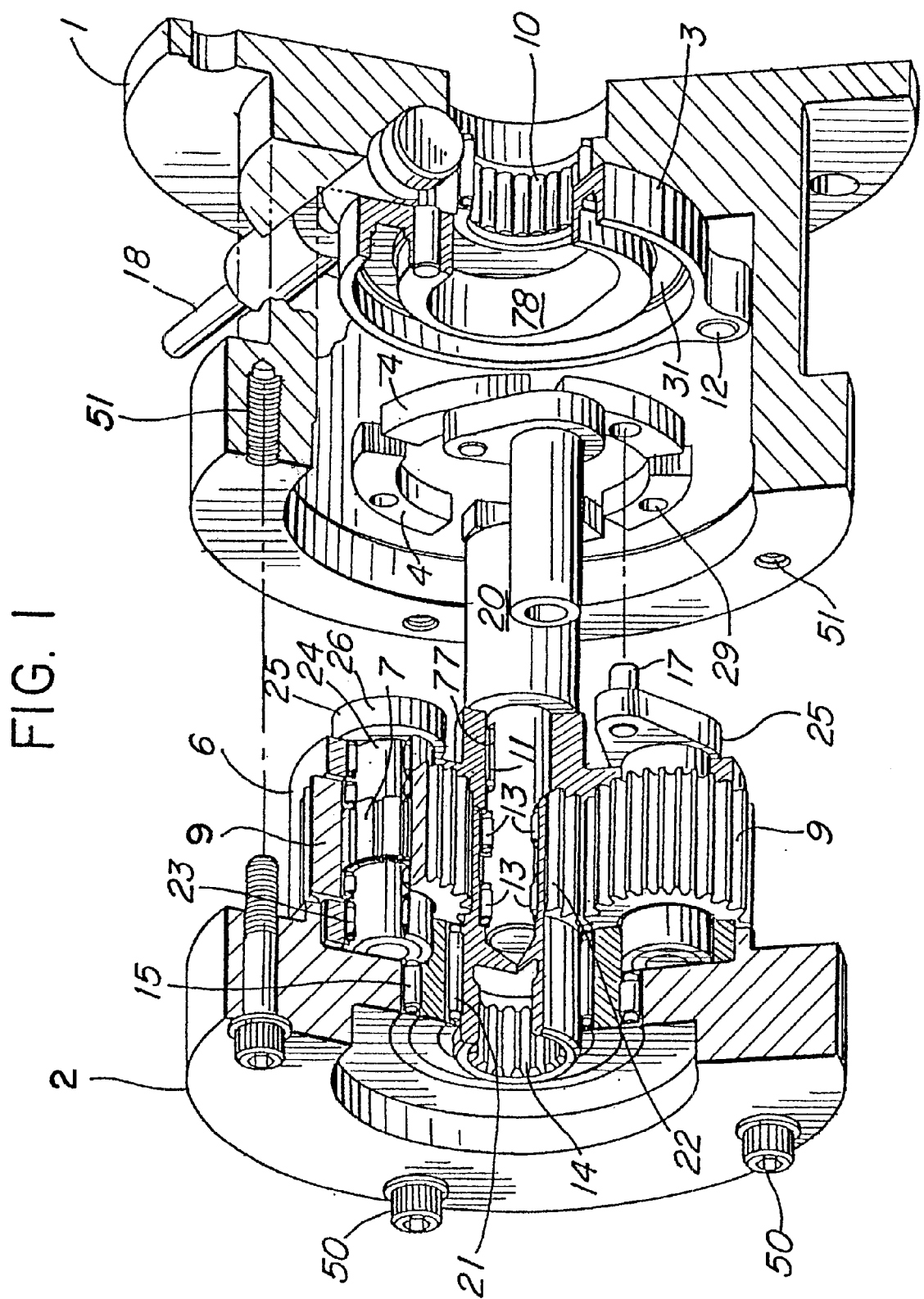
FIG. 1 is an exploded perspective view of one embodiment of the present invention.

FIG. 1 illustrates a first embodiment of the present invention, in which an input rotational velocity transmitted by an input shaft is converted to an output rotational velocity via an output shaft, where the rotational velocity of the output shaft is equal to or greater than the rotational velocity of the input shaft. The transmission assembly comprises a housing 1 and mating end cap 2 joined by a plurality of bolts 50 sized for tapped holes 51. The housing has a centerline longitudinal axis on which the input shaft 20 and output shaft 14 is located. The input shaft 20 is journalled on a first bearing 10, and the carrier 6 to which the input shaft is keyed is further is supported and journalled by a second bearing 15. Input shaft 20 rotates within these bearings and is driven by some prime mover (not shown) at an "input velocity."

Within the housing 1, the input shaft 20 engages with a carrier 6 via a key 11 which fits in a slot 77 on the input shaft 20 and also in a slot in carrier 6, such that the carrier 6 rotates within the housing 1 and with the input shaft 20 in a fixed relationship at the input velocity. The carrier 6 supports a plurality of planetary gears 9 each mounted on one-way, that the sun gear 22 rotates with the velocity of the planetary gears 9 in engagement therewith. The output shaft 14 for the transmission assembly is fixed with the sun gear 22 and rotates with a velocity equal to the sun gear 22. The output shaft 14 and sun gear are supported and journalled on bearings 21 and 13.

Mounted within each planet gear assembly is a crankshaft 25 journalled on bearings 23, where the crankshaft comprises a crankshaft head 26 and a crankshaft shaft 24. The shaft 24 of the crankshaft 25 rotates within the planet gear 9 and is governed by a one-way, overrunning clutch 7 such that: (a) a rotation of the crankshaft 25 in the preferred direction will rotate the planet gear 9 in the same direction at the same speed; and (b) the overrunning clutch 7 allows the planet gear 9 to rotate faster than the crankshaft 25 if another external force is present.

A cam plate 3 within the housing 1 is pinned by pivot pin 12 which allows the cam plate 3 to move in an arced path defined by said pivot pin 12. The cam plate 3 has an eccentric opening 78 through which the input shaft 20 passes, and the shape of the eccentric opening 78 is such that the cam plate 3 always clears and does not contract the input shaft 20 as the cam plate 3 undergoes its full range of motion pivoting about the pivot pin 12. The cam plate 3 can be pivoted by an actuator 18 which may operate pneumatically, hydraulically, electrically, or mechanically. The cam plate 3 further includes an annulus 31 which forms a circular track, and within the annulus 31 is a plurality of shoes 4 each corresponding to one of the plurality of crankshafts 25.

The head 26 of each crankshaft 25 is provided with a pin 17, where a force applied to the pin 17 produces a rotation of the crankshaft 25 in the direction of said force. Each pin 17 from the crankshaft 25 mates with a hole 29 on an opposed surface of said shoe 4 connecting each crankshaft 25 to a shoe 4 in said annulus 31 of said cam plate 3. The individual crankshafts 25 are thus locked into the circular track formed by said annulus 31.

We begin with the situation in which the cam plate 3 is at a position of zero eccentricity, i.e. the annulus 31 is concentric with the input shaft 20. If the input shaft 20 is imparted with an initial input velocity, the input velocity will be communicated to the carrier 6 and the carrier 6 will rotate with the given input velocity. At zero eccentricity, the crankshafts 25 are all aligned with the annulus 31 as the carrier 6 rotates, and there is no relative motion among the plurality of crankshafts 25. Moreover, the crankshaft heads 26 follow the circular track of the annulus 31 without rotating because the concentricity ensures that the relative position of the crankshaft head 26 to the pinned shoe 4 does not change over time. Because the one-way clutches 7 of the planet gears 9 are engaged, the planet gears 9 are locked relative to the carrier 6 and thus rotate only with the same given input velocity as the carrier 6. Thus, the crankshafts 25 all rotate in a fixed formation with the carrier 6 and cause the connected shoes 4 to rotate within the annulus 31 at the same rotational velocity as the input shaft 20. Moreover, the planet gears 9 are all in contact with and drive the sun gear 22 at the same input velocity, which in turn results in the output shaft 14 being driven at the same velocity as the input shaft 20.

Turning now to the situation in which the actuator 18 causes the cam plate 3 to pivot about pivot pin 12, resulting in an eccentricity of the annulus 31 with respect to the input shaft 20. In this case, the input shaft 20 and carrier 6 continue to rotate at input velocity. The carrier 6 still drives the planet gears 9, but now there is a relative motion among each crank shaft 25 due to each crank shaft's relationship between its pinned point at the shoe 4 and the eccentric location of that shoe 4 with respect to the other shoes 4. This relative motion will cause each shaft 24 of the crankshafts 25 to rotate about its own axis at a different speed than the other shafts based on the eccentricity of the driven shoe 4. That is, each crankshaft head 26 has a tangential force applied at the pin 17 due to the eccentricity of the cam plate annulus 31 with respect to the axis of rotation of the plurality of crankshafts 25. This tangential force causes each crankshaft 25 to rotate, and the speed of each crankshaft rotation is governed by the position of the shoe 4 within the annulus 31 and the amount of eccentricity applied.

Each planet gear 9 would rotate with a different velocity (the initial input velocity plus an incremental velocity due to the added rotation of the crankshaft), but for the overrunning clutch 7 which permits a greater rotation than that of the crankshaft 25. The fastest turning planet gear 9 drives the sun gear 22, which in turn drives the remaining planet gears 9. The only clutch engaging its corresponding crankshaft is the one on the shaft 24 of the crankshaft 25 having the highest rotation speed. The other planet gears will overrun on their one-way clutches 7 due to the lower rotational velocity of their respective crankshaft shaft 24. As the carrier 6, planet gears 9, crankshafts 25, and shoes 4 are rotating each crankshaft 25 in turn will have the maximum rotational velocity as the shoes 4 rotate in the cam plate annulus 31. Thus, each crankshaft 25 engages its planetary gear's one-way clutch 7 during part of a cycle and in turn imparts an additional rotation to the output shaft 14. This additional rotational velocity augments the input velocity and ensures that the output velocity will be greater than the input velocity. As the eccentricity increases, the relative motion between the various crankshafts increases and the additional rotational velocity that will be imparted on one of the crankshafts 25 increases, which in turn will be applied to the output shaft 14. However, the transition from one input-to-output ratio to another occurs over a continuous spectrum as the plurality of one-way clutches 7 "hands-off" the highest rotating crankshaft from one to another, with the slower running crankshafts 25 being overrun by the fastest rotating crankshaft 25.

The summing of the intermittent crankshaft rotations can be varied from the given configuration by modifying the transmission without deviating from the same principle. For example, rather than having the sun gear rotate and the housing remain fixed, the relationship could be reversed such that the housing rotated and the sun gear could be stationary.

The aforementioned embodiment demonstrates a transmission in which the ratio of the input to output rotational velocity is on the order of 1:1 to 1:3, although higher or lower maximum velocities are possibly by modifying the components. In a second embodiment illustrated in FIG. 2, the ratio of the input to output rotational velocity has a range from 1:1 to zero. In this embodiment of the invention, there is no carrier such as the one in FIG. 1 which was driven at input velocity and which assured that the output velocity would be at least equal to the input velocity.

Figure 2:
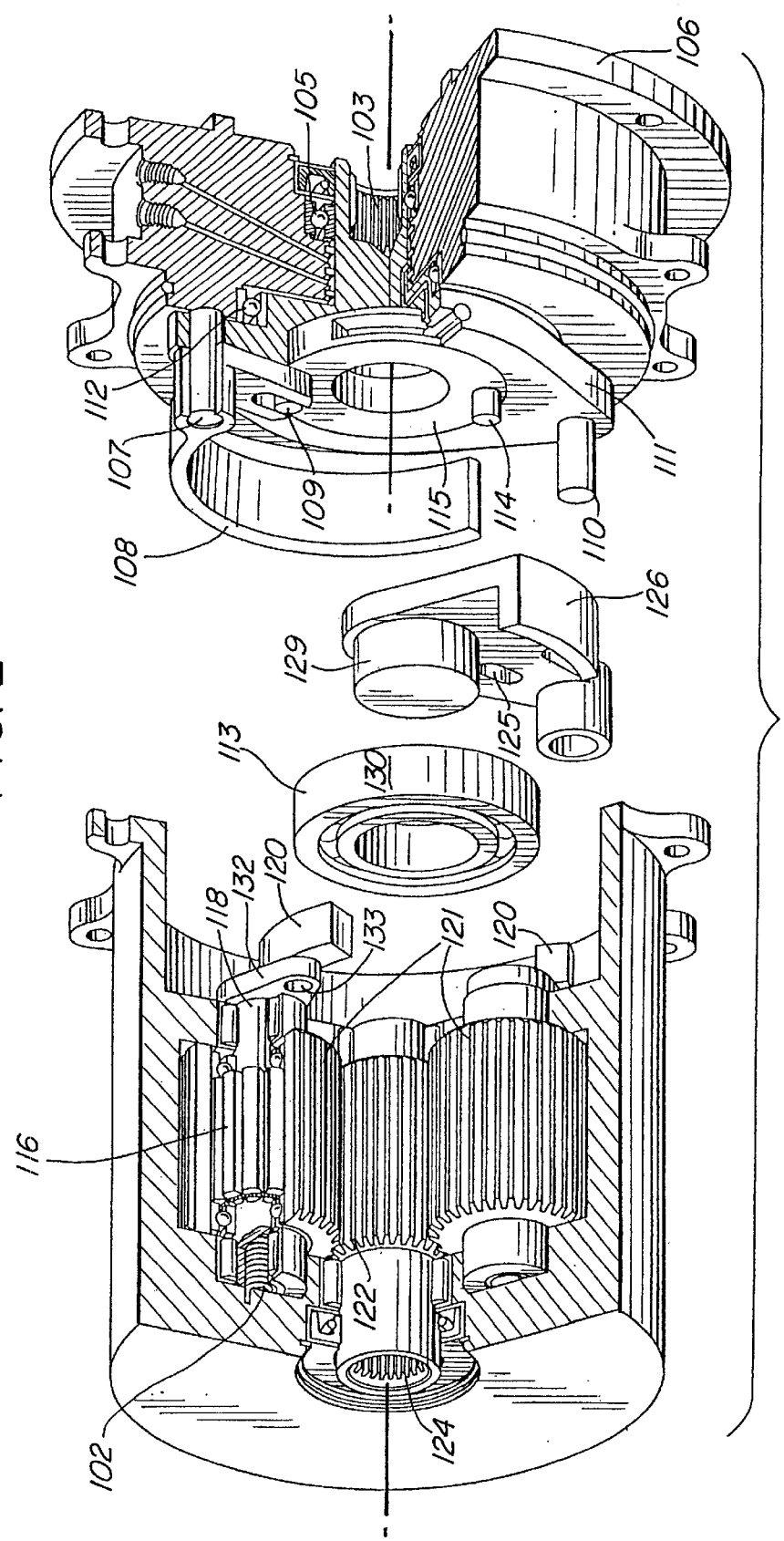
FIG. 2 is an exploded perspective view of a second embodiment of the present invention.

In FIG. 2, bearing 105 is mounted in housing 106 and input shaft 103 drives the drive shaft 111 which is supported by bearings 105 and 112. Pivotally mounted to the drive shaft 111 at pin 107 is a counterbalance weight 108. Drive shaft 111 is equipped with a rotary actuator 115 which rotates within the drive shaft 111 where the rotary actuator 115 is preferably controlled by an external control source (not shown). The rotary actuator 115 includes a rotary actuator pin 114 which mates with a hole 125 on the cam bearing retainer 126 and can cause the cam bearing retainer 126 to pivot about the pivot pin 110 on the drive shaft 111. That is, the cam bearing retainer 126 is seated on the drive shaft 111 at pivot pin 110 and the rotary actuator at pin 114, and a rotation of the rotary actuator 115 will cause the pin 114 to rotate away from pivot pin 110, which in turn causes the cam bearing retainer 126 to pivot or rotate about its seating at pivot pin 110.

Mounted on the cam bearing retainer 126 is the cam bearing 113, which is analogous to the cam plate in the previous embodiment. Here, the cam bearing 113 rotates at input velocity rather than being stationary as in the case of the cam plate. The cam bearing 113 is mounted on the cam bearing support 129 and rotates therewith. In contact with the outer surface 130 of the cam bearing 113 are a plurality of shoes 120 each connected to a crankshaft 132, where the shoes 120 are held in contact with the outer surface 130 by a torsional spring 102 or other conventional means which can maintain an adequate contact pressure.

When the cam bearing 113 is at a zero eccentricity with respect to the centerline axis of input shaft 103 and output shaft 124, the cam bearing 113 rotates with no orbital motion, and no angular force is applied to the shoes 120. Because the shoes 120 are connected to the associated crankshafts 132 in a single direction relationship via one-way clutches 116, in the zero eccentricity case there is no rotational force applied to the crankshaft 132. As a consequence, the planet gears 121 are not actuated and there is no output velocity at output sun gear 122 or output shaft 124.

To initiate a rotational velocity in the output shaft 124, the cam bearing retainer 126 is pivoted at pivot pin 110 by the rotary actuator 115 via the rotary actuator pin 114 such that the cam bearing 113 is eccentrically positioned with respect to the centerline axis of the input shaft 103. This eccentricity causes the cam bearing 113, which is no longer centered on the centerline, to orbit eccentrically about the centerline. This orbiting causes the shoes 120 in contact with the outer surface of the cam bearing to be rotated radially outward from the centerline. Shoe 120 is mounted on pin 133 which is fixed to crankshaft 132, and the "lifting" of the shoe by the orbiting cam bearing 113 imparts a rotation of the crankshaft 132 as the shoe 120 moves with the orbiting of the cam bearing 113. The torsional springs 102 maintain the shoes 120 in contact with the cam bearing's outer surface 130, and as the cam bearing orbits it produces a corresponding rotation of the crankshaft shaft 118. The crankshaft shaft 118 engages the overrunning one-way clutch 116 which controls the associated planet gear 121. With the plurality of shoes 120 each actuating the associated planet gears 121 as just described, the sun gear 122 rotates with a constant rotational velocity governed by the fastest rotating planet gear due to the overrunning clutches 116. Thus, motion is imparted to each planet gear in turn. The rotation of the sun gear 122 is directly imparted to the output shaft 124.

As the cam bearing retainer is moved from concentricity to eccentricity, an unbalance in the drive shaft 111 is generated. However, the counterbalance weight 108 which pivots on pivot pin 107 operates to balance the drive shaft 111 when in eccentric mode. As the rotary actuator 115 is energized to rotate, pin 109 moves the counterbalance weight 108 outward to balance the drive shaft 111.

Figure 3:
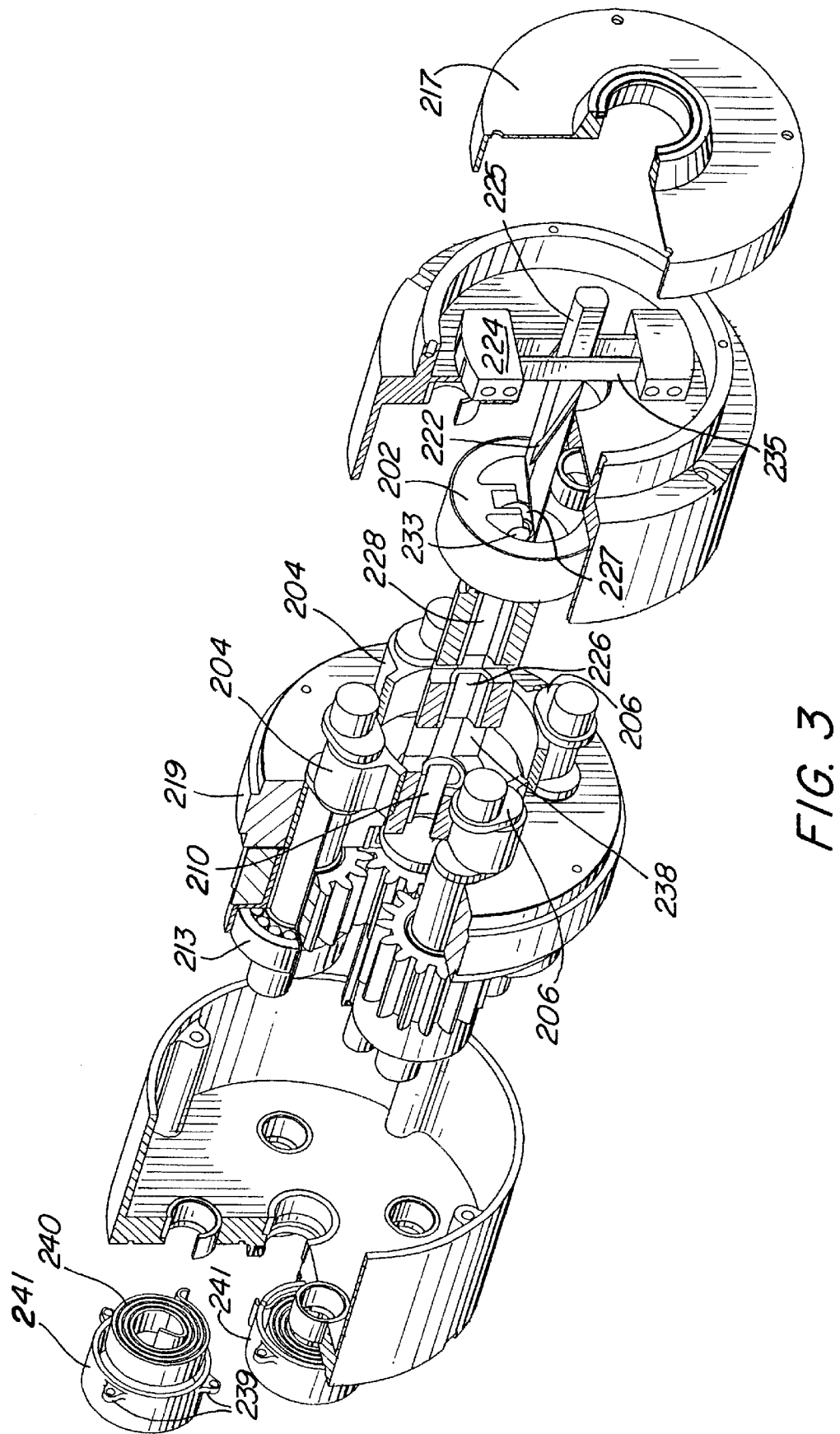
FIG. 3 is an exploded perspective view of a third embodiment of the present invention.
Figure 4:
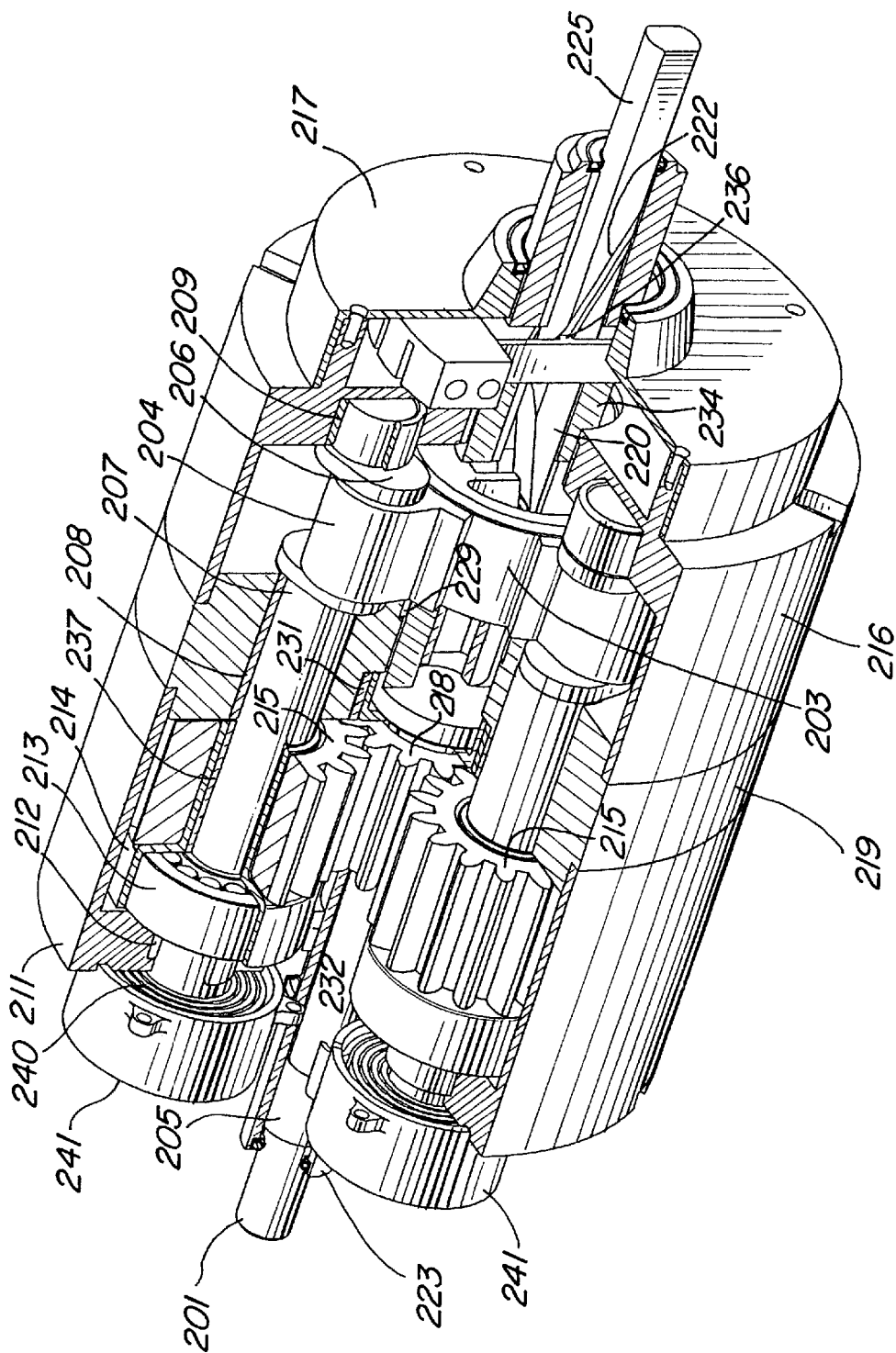
FIG. 4 is a perspective view of the embodiment shown in FIG. 3.

In FIGS. 3 and 4, a third embodiment of the invention is disclosed. Input shaft 201 is supported by needle bearing 205 mounted in output shaft 223 and sleeve bearing 229 mounted in center section 219. Although the input shaft 201 and the output shaft 223 are shown on the same side of the transmission, the output shaft can also be located on the opposite side of the transmission. The output shaft 223 is supported by sleeve bearing 232 and sleeve bearing 231.

The input drive shaft 201 is equipped with an actuator rod 225 supported by and sliding on sleeve bearing 210, sleeve bearing 226, and sleeve bearing 228. These sleeve bearings are mounted within member 234 which comprises part of the input shaft 201. Counterweights 224 are supported by support arms 235 which are positioned radially by a guide 236 which rides in slot 222. Cam actuator 202 with cam bearing 203 are mounted onto input shaft 201 but are free to move in the radial direction. This assembly is guided by slot 238. This assembly is analogous to the cam plate in FIG. 1, but the actuator assembly rotates at input velocity (unlike the cam plate in FIG. 1). Mounted within the cam actuator 202 is a roller bearing 227 which rotates on pin 233. Of course, anti-friction bearings such as ball, roller or needle bearings may be used in place of the sleeve bearings when applicable.

A plurality of cam followers 204 are in contact with the cam bearing 203 and each are connected to a crank 206 which forms a part of crankshaft 207. In this embodiment the followers 204 are held in contact with the cam bearing 203 by a spring 240 contained in spring housing 241. Spring housing 241 includes ears 239 used to mount the spring housings 241 and the springs 240 are clocked to apply the proper load on the cam followers 204 with respect to cam bearing 203. Other means to maintain an adequate contact force to overcome inertia may be substituted for the springs shown.

The crankshaft 207 which includes crank 206 is supported by sleeve bearings 212, 208, and 209. Mounted on crankshaft 207 is a one way clutch 213 with an outer race that is captured in clutch support cup 214. Sleeve bearing 212 are mounted in the housing at drive input end 211 and sleeve bearing 209 is mounted in the housing at the control end 216. Mounted within the clutch support cup 214 is sleeve bearing 237 which permits the one way clutch 213 and planet gear 215 to overrun when a particular crankshaft is not driving the output shaft 223. Control end cover 217 encloses the counter weight assembly 224 and 235.

When the actuator rod 225 moves inward towards the center of the housing, ramp 220 imparts a radial motion to roller bearing 227 which, in turn, moves the cam actuator 202 radially upward. The movement of the cam actuator results in an eccentricity on the cam actuator 202 and cam bearing 203 with respect to the input shaft 201. The amount of eccentricity imparted to cam actuator 202 is dependent upon the stroke imparted to actuator rod 225. When the cam actuator is at zero eccentricity and cam actuator 202 is concentric with respect to the centerline axis of input shaft 201, the cam bearing 203 imparts no force and consequently no motion to the cam followers 204 or crank 206. Because the cam followers 204 are connected to the associated crankshafts 207 in a single directional relationship via the one way clutches 213, at zero eccentricity there is no rotational force applied to the crankshaft 206. As a result, none of the one way clutches 213 are engaged and the planer gears 215 are not actuated. With the planet gears still there is no output velocity at output sun gear 218 or output shaft 223.

To initiate a rotational velocity in the output shaft 223, the cam actuator 202 is moved radially outward by the ramp 220 on actuator rod 225. Here, the actuator rod 225 is moved inward such that the ramp 220 acts on the roller bearings 227 moving the pin 233, which in turn moves the cam bearing 203 outward radially to an eccentric position. This eccentricity of the cam bearing 203 causes the cam bearing to orbit about the centerline of the input shaft axis. This orbiting causes the followers 204 in contact with the surface of the cam bearing 203 to be moved radially outward from the centerline. Since the followers 204 are mounted to a crank 206 which is fixed to a corresponding crankshaft 207, the radial movement of the crank through the followers 204 imparts a rotation to the crankshaft 207 as the followers move with the orbiting cam bearing 203. The springs 240 maintain the followers in contact with the cam bearing 203. As cam bearing 203 rotates it actuates each crankshaft in turn. The crankshaft with the highest rotational velocity engages the one way clutch 213 which engages planet gear 215, while the other crankshafts having less than the highest rotational velocity are overrun. With a plurality of followers 204, each actuating its associated one way clutch 213 and planet gear 215 as described, the sun gear 218 rotates with a constant rotational velocity governed by the fastest rotating planet gear due to the one way clutches. Thus, motion is imparted to each planet gear serially. The rotation of the sun gear 218 is directly imparted to the output shaft 223.

As the cam bearing 203 is moved from a concentric position to an eccentric position an unbalance in the input shaft is created. However, counterweight 224 moves in unison with the cam eccentric 202 and cam bearing 203, but in an opposite direction. In this manner, the unbalance caused by the load on the input shaft is counteracted by the counterbalance.

The first embodiment of the continuously variable transmission increases the rotational velocity of the input shaft at the output shaft in a continuous spectrum of ratios. This type of transmission is suitable for constant speed alternator drives, test equipment drives, machine tool drives, power take-off drives, and so forth, where the input velocity can vary and the output velocity has to remain constant, or where the output velocity should remain above the input velocity. The second and third embodiments differs from the first in that the output velocity is between the input velocity and zero. Such a transmission is especially suitable for all types of vehicle transmissions, hoisting devices, processing equipment, and others.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A continuously variable transmission comprising:

a drive shaft rotating with an input rotational velocity;

a cam bearing positionable between a concentric position aligned with respect to an axis of rotation of said drive shaft, and an eccentric position offset from said axis of rotation, where said cam bearing rotates with said drive shaft without orbiting when occupying said concentric position and where said cam bearing rotates with said drive shaft and with orbiting when occupying said eccentric position;

a counterweight assembly mounted operably to said input shaft to counteract an imbalance in said input shaft due to said cam bearing moving from the concentric position to the eccentric position;

a plurality of cam followers held in contact with said cam bearing by a corresponding spring, each of said plurality of cam followers connected to a crankshaft spaced circumferentially about said cam bearing such that when said cam bearing is positioned in said eccentric position said cam bearing rotates said crankshafts;

a plurality of planet gears each disposed about one of said plurality of crankshafts and driven by said crankshaft via an overrunning clutch, where a rotation of said crankshaft results in a rotation of said planet gear; and a sun gear in operable relationship with said plurality of planet gears and being driven by said planet gear with a highest rotational velocity, said sun gear communicating said highest rotational velocity to an output shaft as an output rotational velocity.

2. The continuously variable transmission of claim 1 further comprising an actuator rod disposed within said input shaft and including a ramp member, wherein a movement of said actuator rod imparts a radial movement of the cam bearing via said ramp member, causing said cam bearing to move from said concentric position to said eccentric position.

* * * * *